US011114798B2

(12) United States Patent
Kondo

(10) Patent No.: US 11,114,798 B2
(45) Date of Patent: Sep. 7, 2021

(54) CONNECTOR

(71) Applicant: Sumitomo Wiring Systems, Ltd., Yokkaichi (JP)

(72) Inventor: Tomoyuki Kondo, Yokkaichi (JP)

(73) Assignee: Sumitomo Wiring Systems, Ltd.

( * ) Notice: Subject to any disclaimer, the term of this patent is extended or adjusted under 35 U.S.C. 154(b) by 0 days.

(21) Appl. No.: 16/932,686

(22) Filed: Jul. 17, 2020

(65) Prior Publication Data
US 2021/0044057 A1 Feb. 11, 2021

(30) Foreign Application Priority Data

Aug. 7, 2019 (JP) .............................. JP2019-145268

(51) Int. Cl.
*H01R 13/533* (2006.01)
*H01R 9/22* (2006.01)
*H01R 13/10* (2006.01)
*H01R 13/52* (2006.01)
*H01R 13/502* (2006.01)

(52) U.S. Cl.
CPC ........... *H01R 13/533* (2013.01); *H01R 9/226* (2013.01); *H01R 13/10* (2013.01); *H01R 13/502* (2013.01); *H01R 13/521* (2013.01); *H01R 13/5213* (2013.01)

(58) Field of Classification Search
CPC ...... H01R 13/533; H01R 9/226; H01R 13/10; H01R 13/502; H01R 13/521; H01R 13/5213
See application file for complete search history.

(56) References Cited

U.S. PATENT DOCUMENTS

| 6,478,614 | B1 * | 11/2002 | De'Longhi | ............ | H01R 13/52 |
| | | | | | 439/139 |
| 2019/0386431 | A1 * | 12/2019 | Sato | ............. | B60R 16/0231 |

FOREIGN PATENT DOCUMENTS

| FR | 3077936 A1 * | 8/2019 | ......... H01R 13/5804 |
| JP | 2017-216202 | 12/2017 | |

* cited by examiner

*Primary Examiner* — Tho D Ta
(74) *Attorney, Agent, or Firm* — Gerald E. Hespos; Michael J. Porco; Matthew T. Hespos

(57) ABSTRACT

A connector (10) includes busbars (40A, 40B) including connecting portions (43) to be connected to terminals (101) of wires (100A, 100B) routed inside a case. Further, the connector (10) includes a housing (80) made of resin and including a separation wall (81) separating the inside and outside of the case. Further, the connector (10) includes a cover (90) made of resin and to be mounted on the housing (80) to cover the connecting portions (43). The busbar (40A, 40B) includes one end part provided with the connecting portion (43) and another end part on a side opposite to the one end part. The busbar (40A, 40B) is embedded in the separation wall (81) of the housing (80) and the one and the other end parts are exposed from the separation wall (81).

6 Claims, 5 Drawing Sheets

CONNECTOR

BACKGROUND

Field of the Invention

This disclosure relates to a connector.

Related Art

Japanese Unexamined Patent Publication No. 2017-216202 discloses a connector that is mounted on a case of an automatic transmission of an automotive vehicle to electrically connect devices inside and outside the case. The connector includes terminals to be connected to end parts of wires and a housing made of resin for holding the terminals. The housing includes an accommodating portion for accommodating the end parts of the wires. A sealing member is provided between the outer peripheral surfaces of the respective wires and the inner peripheral surface of the accommodating portion. The sealing member includes wire insertion holes that can receive and closely contact the wires. The sealing member also has an outer periphery that closely contacts an inner wall of the accommodating portion. Thus, the sealing member ensures that foreign matter, such as oil, to be scattered inside the case will not enter the accommodating portion that accommodates the end parts of the respective wires.

The connector described in in Japanese Unexamined Patent Publication No. 2017-216202 has the sealing member between the outer peripheral surfaces of the respective wires and the accommodating portion of the housing. Thus, the housing may be enlarged due to an increase in intervals between the wires and an increase in intervals between the wires and the accommodating portion.

This disclosure relates to a connector that is reducible in size.

SUMMARY

This disclosure is directed to a connector to be mounted on a case to electrically connect a device arranged inside the case and a device arranged outside the case. The connector includes a busbar, a housing and a cover. The busbar has a connecting portion to be connected to a terminal of a wire routed inside the case. The housing is made of resin and includes a separation wall separating the inside and outside of the case. The cover also is made of resin and is to be mounted on the housing to cover the connecting portion. The busbar includes a first end part provided with the connecting portion and a second end opposite to the first end part. The busbar is embedded in the separation wall, but the first and second end parts are exposed from the separation wall.

According to this configuration, the terminal of the wire routed inside the case is connected to the connecting portion provided in the first end part of the busbar, and this connecting portion is covered by the cover mounted on the housing. Thus, if the connector is applied to a case in which oil is scattered, such as a case of an automatic transmission of an automotive vehicle, the scattered oil cannot splash directly on the connecting portion, and the oil cannot reach the connecting portion. Further, a sealing member to suppress adhesion of oil to the connecting portion can be omitted. Therefore, the housing and the connector can be smaller.

Plural busbars may be provided, and accommodating portions may be defined by the housing and the cover for individually accommodating the connecting portions. A partition wall may be provided for partitioning between the accommodating portions. According to this configuration, the connecting portions of the busbars are accommodated individually in the accommodating portions. Further, the partition wall partitions the accommodating portions from each other. Thus, even if a conductive foreign matter, such as oil, enters the accommodating portions, the spread of this foreign matter between the accommodating portions is suppressed. Therefore, the busbars will not be short circuited by the foreign matter The connecting portion may include an insertion hole for receiving a bolt for fastening the terminal to the connecting portion, and the cover may be a part facing the insertion hole. According to this configuration, the side wall is not present in a state if the cover is not mounted on the housing. Thus, the side wall is less likely to hinder an operation of fastening the connecting portions of the busbars and the terminals of the wires by the bolts. Therefore, this operation can be performed easily and the cover is mounted on the housing after this operation to prevent the entrance of foreign matter such as oil into the accommodating portions.

If an edge of the housing wall and an edge of the cover wall are butted against each other to configure the accommodating portions, oil can enter the accommodating portions between these end edges. Accordingly, a wall rising from the housing and a wall rising from the cover may include overlapping portions overlapping each other in a thickness direction of a side wall of the accommodating portion. According to this configuration, the overlapping portions of the housing wall and the cover wall make the entrance path for oil longer by so that foreign matter, such as oil, is less likely to enter the accommodating portions through this entrance path.

A restricting wall for restricting a path for the wire may be provided continuously with a side wall forming the accommodating portion. The restricting wall restricts the path for the wire. Thus, a configuration around the connector can be simplified as compared to the case where a restricting member for restricting the path for the wire is provided separately from the connector.

According to the present disclosure, a connector can be reduced in size.

DETAILED DESCRIPTION

A specific example of the connector of this disclosure is described below with reference to the drawings. In each drawing, a configuration may be partially shown in an exaggerated or simplified manner for the convenience of description. Further, a dimension ratio of each part may be different in each drawing. Note that the invention is not limited to these illustrations and is intended to be represented by claims and include all changes in the scope of claims and in the meaning and scope of equivalents. "Parallel" and "orthogonal" in this specification mean not only strictly parallel and orthogonal, but also substantially parallel and orthogonal within such a range as to achieve functions and effects in this embodiment.

Figure 1:
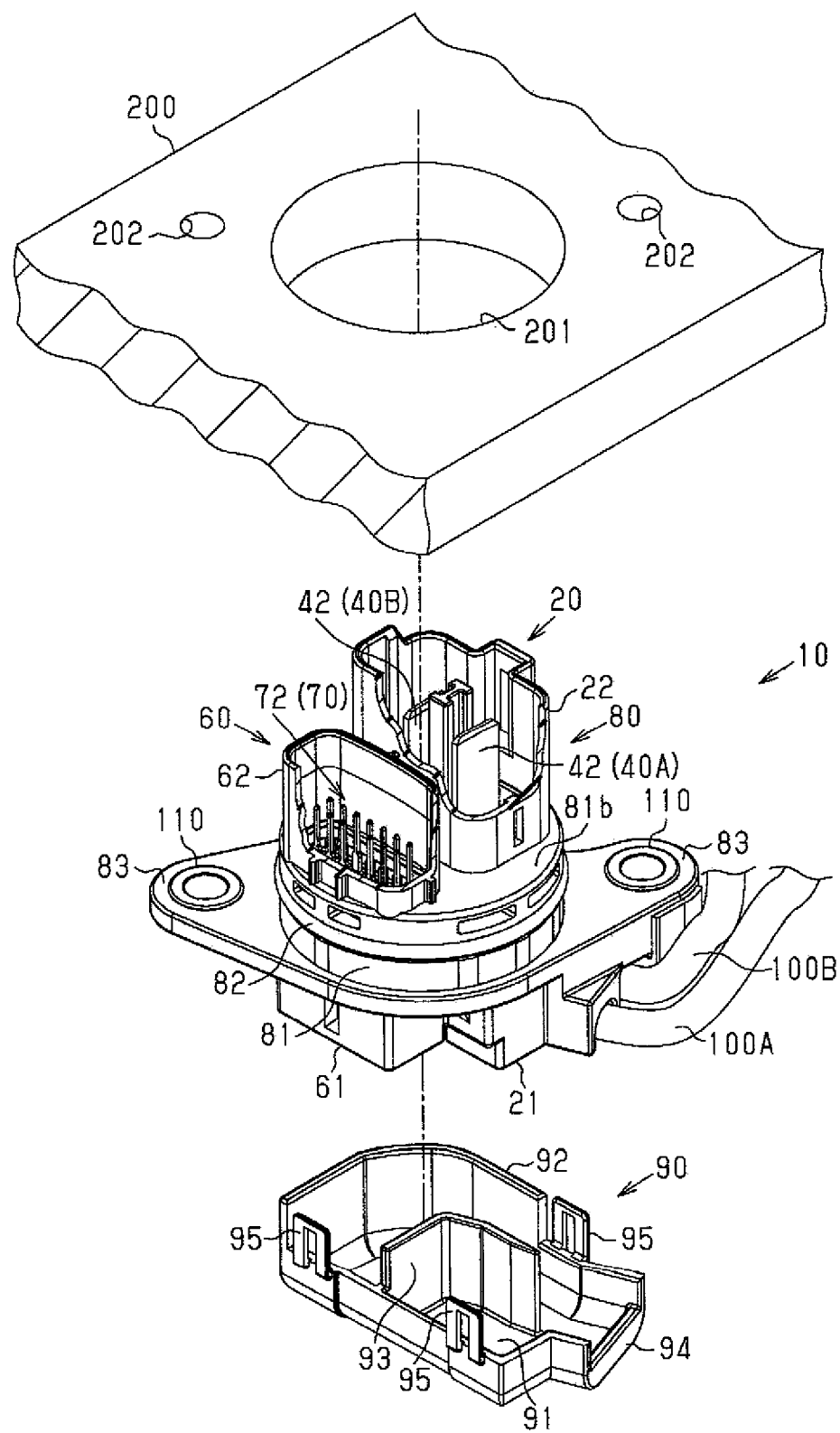
FIG. 1 is an exploded perspective view of a connector in one embodiment.

As shown in FIG. 1, a connector 10 is mounted in a circular mounting hole 201 formed in a case 200 of a transmission of an automotive vehicle to electrically connect a device (not shown) arranged inside the case 200 and a device (not shown) arranged outside.

The connector 10 includes a housing 80 made of resin and molded with two busbars 40A, 40B and metal terminals 70 inserted. The housing 80 is made, for example, of PPS (polyphenylene sulfide) resin.

Figure 2:
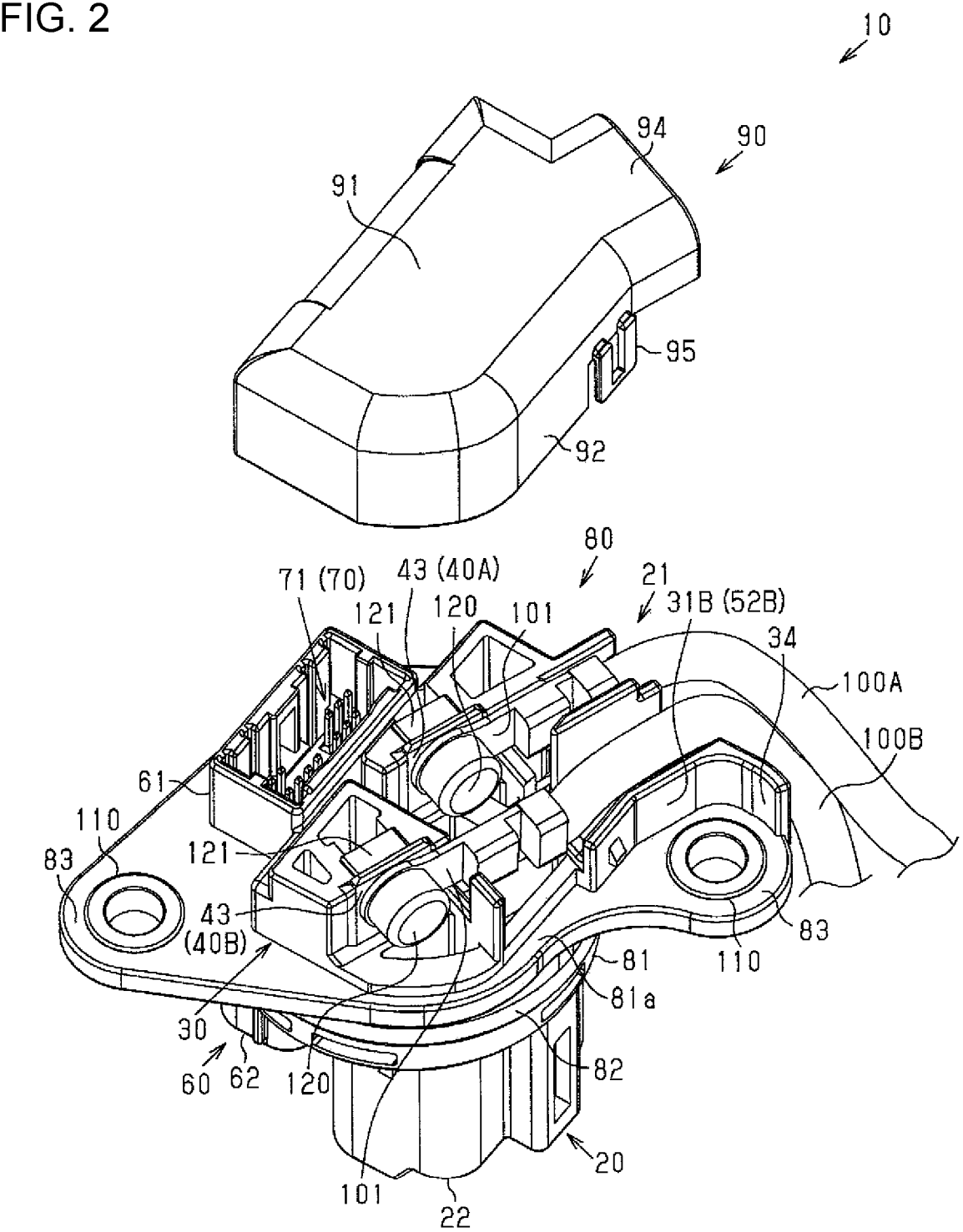
FIG. 2 is an exploded perspective view of the connector of the embodiment viewed from one end surface side of a separation wall.

As shown in FIGS. 1 and 2, the housing 80 includes a separation wall 81 to be inserted into the mounting hole 201 of the case 200 to separate the inside and outside of the case 200. The separation wall 81 has a cylindrical part, and an annular sealing member 82 is provided on the outer peripheral surface of this cylindrical part. In this way, sealing is provided between the separation wall 81 and the case 200. The separation wall 81 has a first end surface 81a exposed inside the case 200 and another end surface 81b exposed outside the case 200.

Two flanges 83 for mounting the connector 10 on the case 200 project from the separation wall 81 toward an outer periphery. The flanges 83 project in opposite directions along an inner surface of the case 200. Note that the respective flanges 83 are flush with the first end surface 81a of the separation wall 81 (see FIG. 2).

Each flange 83 has a hollow cylindrical collar 110. The connector 10 is mounted on the case 200 by inserting bolts (not shown) into the respective collars 110 and screwing screws into screw holes 202 formed in the case 200.

The connector 10 of this embodiment comprises an integral first connector 20 and an integral second connector 60.

The connector 10 includes a cover 90 made of resin and to be mounted on the housing 80 of the first connector 20, from the side of the one end surface 81a of the separation wall 81. The cover 90 is, for example, made of polyamide resin.

Figure 3:
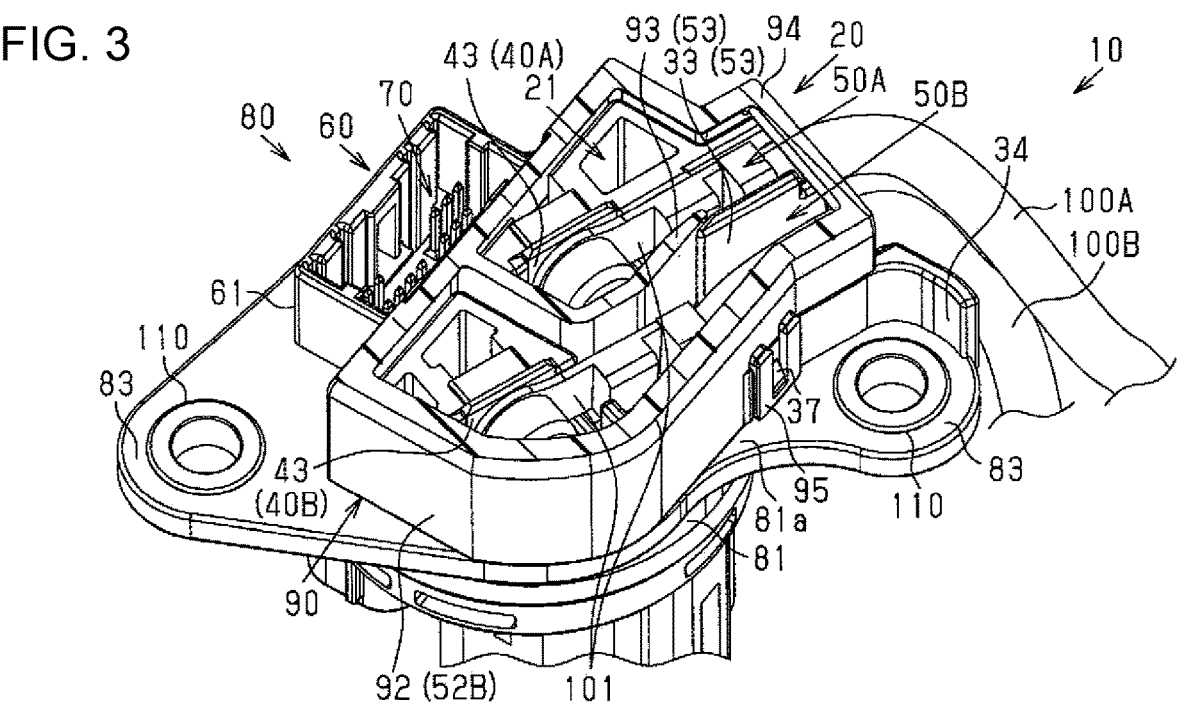
FIG. 3 is a perspective view showing accommodating portions.
Figure 4:
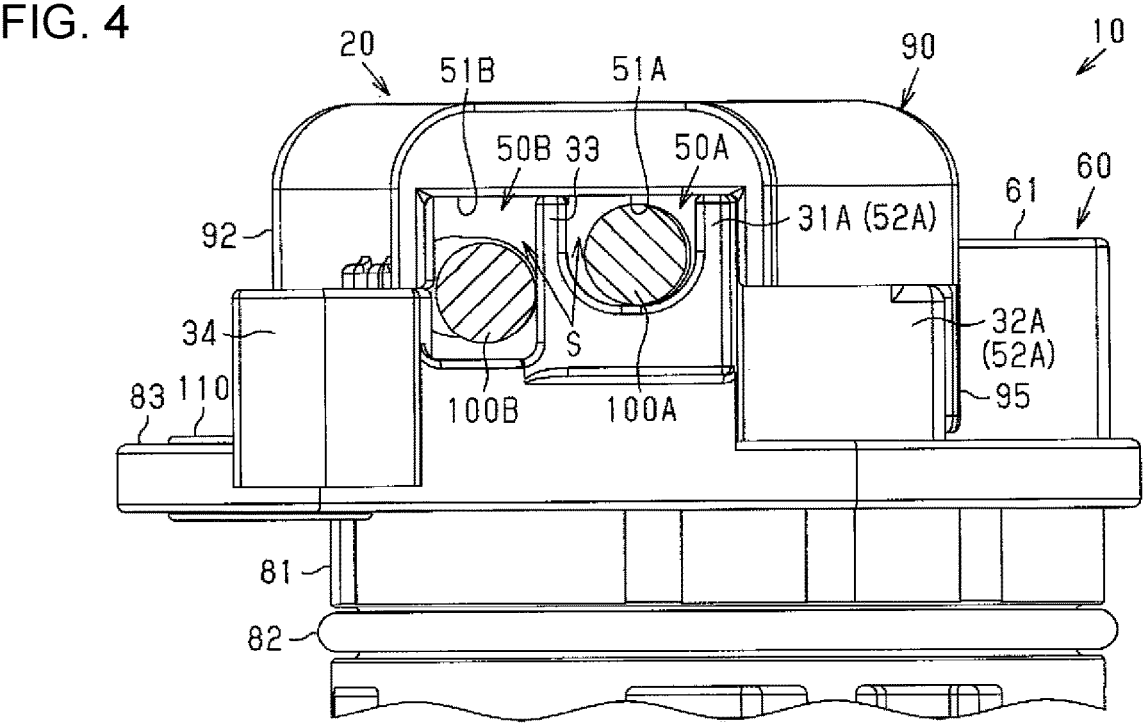
FIG. 4 is a side view showing an opening of the accommodating portions.

As shown in FIGS. 3 and 4, substantially tubular first and second accommodating portions 50A and 50B are formed in the first connector 20 by mounting the cover 90 on the housing 80. The respective accommodating portions 50A, 50B include openings 51A, 51B adjacent to each other, extend in a direction of the one end surface 81a of the separation wall 81 and are parallel to each other. The accommodating portion 50B is longer than the accommodating portion 50A in an extending direction of the accommodating portions 50A, 50B.

The end of the openings 51A, 51B in the extending direction of the accommodating portions 50A, 50B is referred to as a base end and an end opposite to the base end in the extending direction is referred to below as a tip.

Two wires 100A, 100B arranged in parallel to each other are routed inside the case 200. Terminals 101 made of metal are provided on the tips of the respective wires 100A, 100B. The respective terminals 101 and the tips of the respective wires 100A, 100B are accommodated in the accommodating portions 50A, 50B through the respective openings 51A, 51B. The terminal 101 of the wire 100B is located more on the tip side in the extending direction than the terminal 101 of the wire 100A.

As shown in FIG. 4, clearances S are provided between the inner peripheral edges of the openings 51A, 51B and the respective wires 100A, 100B.

<First Connector 20>

As shown in FIGS. 1 and 2, the first connector 20 includes an inner connecting portion 21 formed to project inward of the case 200 and a tubular outer connecting portion 22 formed to project outward of the case 200. The respective accommodating portions 50A, 50B described above are formed by the inner connecting portion 21 and the cover 90.

The first connector 20 is molded with the two busbars 40A, 40B inserted. Each busbar 40A, 40B is formed by press-working a metal plate material, e.g. copper, copper alloy, aluminum or aluminum alloy.

Figure 5:
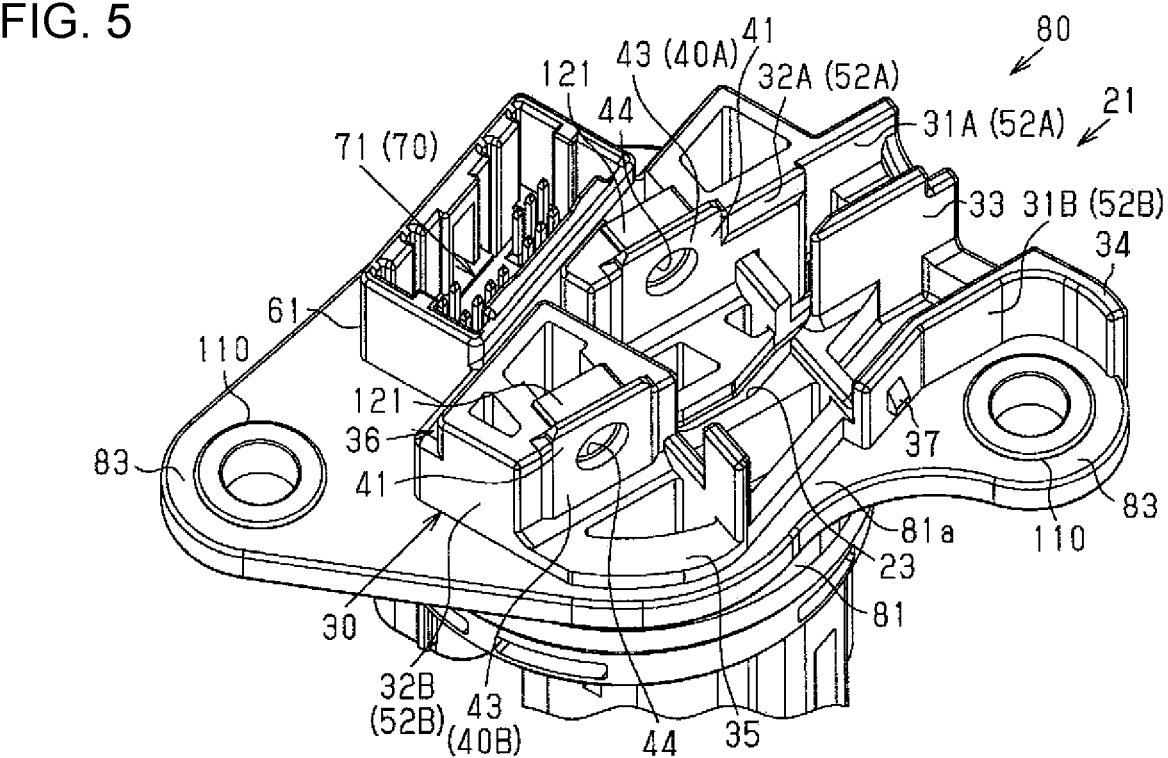
FIG. 5 is a perspective view of a housing viewed from the one end surface side of the separation wall.

As shown in FIG. 5, each busbar 40A, 40B is embedded in the separation wall 81 of the housing 80. A first end part 41 of each busbar 40A, 40B is exposed on the side of the one end surface 81a of the separation wall 81. The first end part 41 of each busbar 40A, 40B includes a connecting portion 43 to be connected to the terminal 101 of the corresponding wire 100A, 100B. Each connecting portion 43 is formed with an insertion hole 44 into which a bolt 120 for fastening the corresponding terminal 101 to this connecting portion 43 is insertable.

The respective connecting portions 43 are arranged so that axes of the respective insertion holes 44 are parallel to each other and do not overlap in an axial direction.

The inner connecting portion 21 includes a housing wall 30 rising from the one end surface 81a of the separation wall 81. The housing wall 30 constitutes parts of side walls 52A, 52B of the respective accommodating portions 50A, 50B. The side walls 52A, 52B are parts of the respective accommodating portions 50A, 50B orthogonal to the one end surface 81a of the separation wall 81 and surround outer peripheries of the accommodating portions 50A, 50B.

A first base end wall 31A is provided on a part of the side wall 52A on the base end.

A first mounting wall 32A constituting a part of the side wall 52A is provided on a tip side of the first base end wall 31A. The connecting portion 43 of the busbar 40A is exposed along the first mounting wall 32A, and a nut 121 is provided on the underside of this connecting portion 43.

As shown in FIG. 2, the connecting portion 43 and the terminal 101 are fastened and the wire 100A and the busbar 40A are connected electrically by inserting the bolt 120 through the terminal 101 of the wire 100A and the insertion hole 44 of the busbar 40A and screwing the bolt 120 into the nut 121.

As shown in FIG. 5, a second base end wall 31B is provided on a part of the side wall 52B on the base side end.

As shown in FIGS. 2 and 3, a restricting wall 34 extends along an outer periphery of the flange 83 and is continuous with a base end of the second base end wall 31B. The restricting wall 34 restricts a path for the wire 100B pulled out from the accommodating portion 50B.

As shown in FIG. 5, the housing wall 30 includes a second mounting wall 32B constituting a part of the side wall 52B on the tip side. The connecting portion 43 of the busbar 40B is exposed along the second mounting wall 32B. A nut 121 is provided on the underside of this connecting portion 43.

As shown in FIG. 2, the bolt 120 is inserted through the terminal 101 of the wire 100B and through the insertion hole 44 of the busbar 40B. The bolt 120 then is screwed into the nut 121 to fasten the connecting portion 43 and the terminal 101 so that the wire 100B and the busbar 40B are connected electrically.

Figure 6:
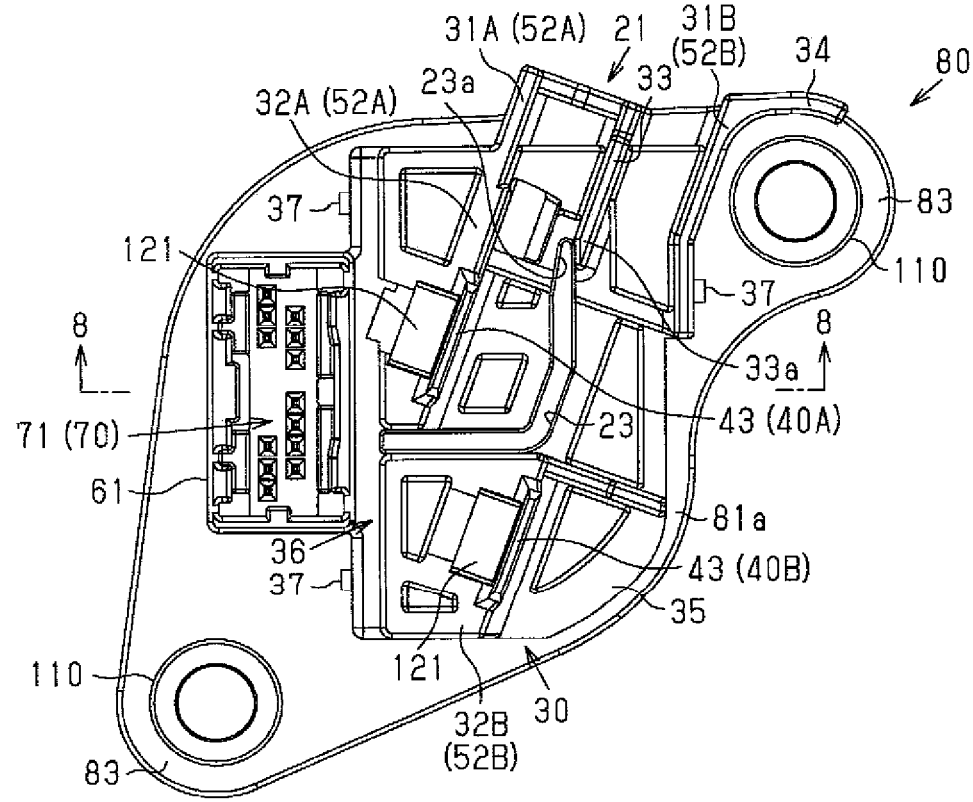
FIG. 6 is a plan view of the housing viewed from the one end surface side of the separation wall.

As shown in FIGS. 5 and 6, a section wall 33 is provided between the first and second base end walls 31A, 31B and sections between parts of the respective accommodating portions 50A, 50B on the base end side.

The inner connecting portion 21 is formed with a groove 23 extending toward the tip side from the vicinity of the tip of the section wall 33, curved and connected to the vicinity of the tip of the first mounting wall 32A.

As shown in FIG. 6, a tip 33a of the section wall 33 and a base end 23a of the groove 23 are adjacent in an arrangement direction of the accommodating portions 50A, 50B.

As shown in FIG. 5, the housing wall 30 includes a coupling wall 35 coupling the second base end wall 31B and the second mounting wall 32B. A projecting height of the coupling wall 35 from the first end surface 81a of the separation wall 81 is smaller than heights of the second base end wall 31B and the second mounting wall 32B from the one end surface 81a of the separation wall 81. The projecting height of the coupling wall 35 is smaller than heights of the connecting portions 43 of the respective busbars 40A, 40B from the one end surface 81a of the separation wall 81.

Figure 7:
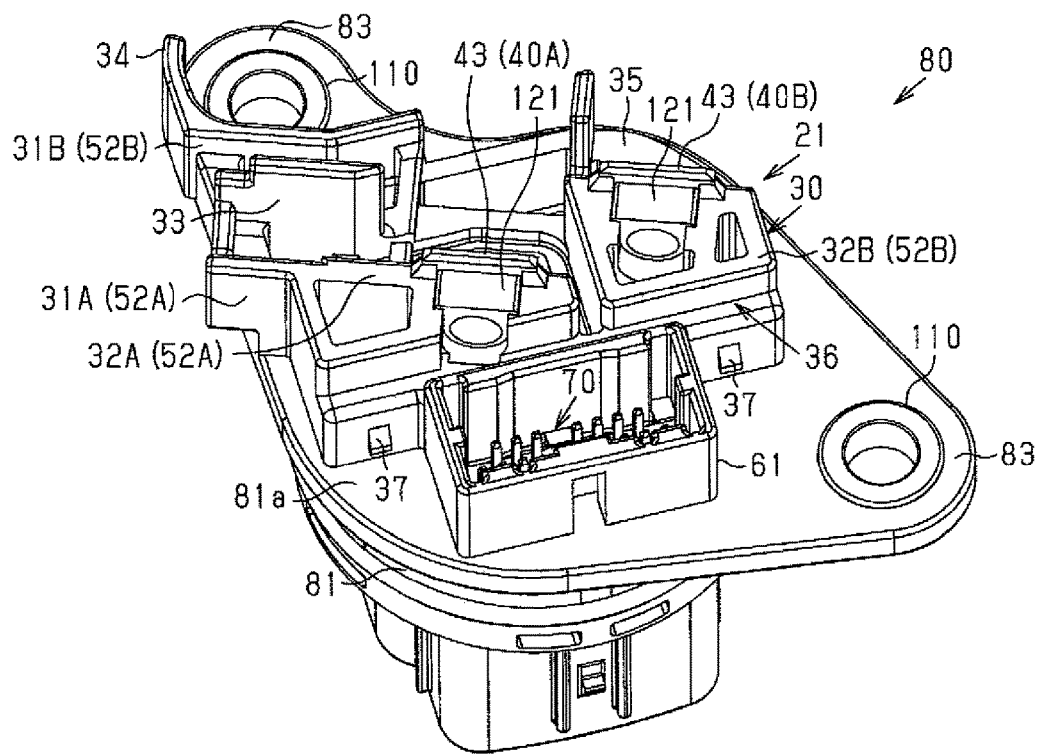
FIG. 7 is a perspective view of the housing viewed from the one end surface side of the separation wall.

As shown in FIG. 7, a step 36 is provided over the entire first and second mounting walls 32A, 32B on an outer side surface of the housing wall 30 on the side of an inner connecting portion 61 to be described later.

Two locking claws 37 are provided on the above outer surface of the housing wall 30.

As shown in FIG. 5, the locking claw 37 is provided on an outer side surface of the second base end wall 31B.

As shown in FIG. 1, second end parts 42 of the respective busbars 40A, 40B are exposed in the outer connecting portion 22 of the first connector 20. Note that, although not shown, a potting material is filled in the outer connecting portion 22. A male connector (not shown) extending from the above device arranged outside the case 200 is connected to the outer connecting portion 22.

<Second Connector 60>

As shown in FIGS. 1 and 2, the second connector 60 includes the tubular inner connecting portion 61 formed to project inward of the case 200 and a tubular outer connecting portion 62 is formed to project outward of the case 200.

The second connector 60 is molded with the metal terminals 70 inserted. Each metal terminal 70 is formed by press-working a metal plate material, e.g. copper, copper alloy, aluminum or aluminum alloy.

Figure 8:
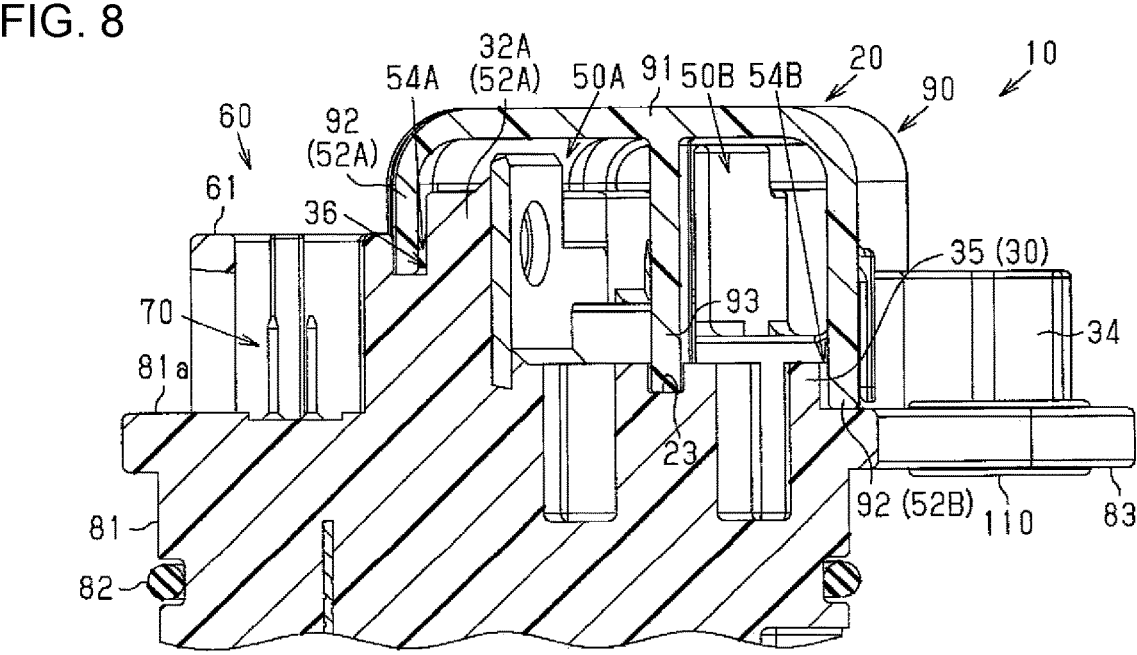
FIG. 8 is a section along 8-8 of FIG. 6.

As shown in FIG. 2, one end part 71 of each metal terminal 70 is exposed in the inner connecting portion 61 of the second connector 60. A male connector (not shown) extending from the device arranged inside the case 200 is connected to the inner connecting portion 61. Note that, as shown in FIG. 8, the inner connecting portion 61 projects to a position more distant from the one end surface 81a than the step 36 of the first connector 20.

As shown in FIG. 1, another end part 72 of each metal terminal 70 is exposed in the outer connecting portion 62 of the second connector 60. Although not shown, a potting material is filled in the outer connecting portion 62. A male connector (not shown) extending from the device arranged outside the case 200 is connected to the outer connecting portion 62.

<Cover 90>

As shown in FIGS. 1 and 2, the cover 90 includes a bottom wall 91 facing the one end surface 81a of the separation wall 80, a cover wall 92 rising from the outer peripheral edge of the bottom wall 91 and a section wall 93 rising from the inner surface of the bottom wall 91. The bottom wall 91 has a substantially rectangular shape with long and short sides in a plan view.

The cover 90 includes a pull-out portion 94 that constitutes parts of the openings 51A, 51B of the respective accommodating portions 50A, 50B and from which the respective wires 100A, 100B are pulled out.

The cover wall 92 has three locking portions 95. The cover 90 is mounted on the inner connecting portion 21 by locking the locking portions 95 to the respective locking claws 37. Thus, the cover 90 covers connecting portions 43 of the respective busbars 40A, 40B.

<Accommodating Portions 50A, 50B>

As shown in FIG. 3, the respective accommodating portions 50A, 50B are defined by the inner connecting portion 21 and the cover 90 and individually accommodate the connecting portions 43 of the respective busbars 40A, 40B.

A partition wall 53 is provided between the accommodating portions 50A, 50B, and is configured by connecting the section wall 33 of the housing wall 30 and the section wall 93 of the cover 90 to partition between the accommodating portions 50A, 50B.

As shown in FIGS. 3 and 5, a part of the partition wall 53 facing the insertion hole 44 of the busbar 40A is configured by the section wall 93 of the cover 90. Specifically, the housing wall 30 is not provided in this section.

As shown in FIG. 8, the tip of the section wall 93 of the cover 90 is located in the groove 23 of the inner connecting portion 21.

As shown in FIGS. 3 and 5, a part of the side wall 52B of the second accommodating portion 50B facing the insertion hole 44 of the busbar 40B and a part thereof facing the insertion hole 44 of the busbar 40A are configured by the cover wall 92 of the cover 90. Specifically, the housing wall 30 is not provided in these parts.

As shown in FIG. 8, the first connector 20 includes an overlapping portion 54A in which the step 36 of the housing wall 30 and the cover wall 92 of the cover 90 overlap each other in a thickness direction of the side wall 52A. Further, the first connector 20 includes an overlapping portion 54B in which the coupling wall 35 of the housing wall 30 and the cover wall 92 of the cover 90 overlap each other in a thickness direction of the side wall 52B.

The busbars 40A, 40B are embedded in the separation wall 81 of the housing 80. Further, the first and the second end parts 41, 42 of each busbar 40A, 40B are exposed from the separation wall 81. The terminal 101 of each wire 100A, 100B routed inside the case 200 is connected to the connecting portion 43 provided on the first end part 41 of each busbar 40A, 40B and the connecting portions 43 are covered by the cover 90 mounted on the housing 80 from the side of the first end surface 81a of the separation wall 81, i.e. from the inner side of the case 200. Thus, oil scattered in the case 200 of the automatic transmission of the automotive vehicle cannot splash directly on the connecting portions 43 and cannot arrive at the connecting portions 43.

The connector 10 includes the busbars 40A, 40B having the connecting portions 43 to be connected to the terminals 101 of the wires 100A, 100B routed inside the case 200. Further, the connector 10 includes the housing 80 made of resin and having the separation wall 81 separating the inside and outside of the case 200. Further, the connector 10 has the cover 90 made of resin and is to be mounted on the housing 80 to cover the connecting portions 43. The busbar 40A, 40B includes the first end part 41 with the connecting portion 43 and the second end part 42 on the end opposite to the second end part 41. The busbars 40A, 40B are embedded in the separation wall 81 of the housing 80 and the end parts 41, 42 are exposed from the separation wall 81. According to this configuration, a sealing member for suppressing the adhesion of oil to the connecting portions 43 can be omitted since the above functions are achieved. Thus, the housing 80 and the connector 10 can be smaller.

The accommodating portions 50A, 50B are defined by the housing 80 and the cover 90 and individually accommodate the respective connecting portions 43. The partition wall 53 is provided between the respective accommodating portions 50A, 50B. According to this configuration, the connecting portions 43 of the busbars 40A, 40B are accommodated individually in the respective accommodating portions 50A, 50B. Further, the accommodating portions 50A, 50B are partitioned from each other by the partition wall 53. Thus, for example, even if a conductive foreign matter, such as oil, enters the accommodating portions 50A, 50B, the spread of this foreign matter between the accommodating portions 50A, 50B is suppressed. Therefore, foreign matter cannot cause a short circuit between the busbars 40A, 40B.

The connecting portion 43 includes the insertion hole 44 into which the bolt 120 for fastening the terminal 101 to the connecting portion 43 is insertable. A part of the side wall 52B forming the accommodating portion 50B is configured by the cover 90, and the side wall 52B is not present in this part in a state where the cover 90 is not mounted on the housing 80. Thus, the side wall 52B is less likely to hinder an operation of threading the bolds 130 to fasten the connecting portions 43 of the busbars 40A, 40B and the terminals 101 of the wires 100A, 100B. Therefore, this operation can be performed easily. By mounting the cover 90 on the housing 80 after this operation, the above part is covered by the cover 90 prevents the entrance of foreign matter, such as oil, into the accommodating portions 50A, 50B.

The housing wall 30 rising from the housing 80 and the cover wall 92 rising from the cover 90 include the overlapping portions 54A, 54B overlapping each other in the thickness direction of the side walls 52A, 52B.

For example, in the case where an end edge of the housing wall 30 and an end edge of the cover wall 92 are butted against each other to configure the respective accommodating portions 50A, 50B, an entrance path when oil enters the respective accommodating portions 50A, 50B is a part between these end edges.

However, according to the invention, the entrance path for oil is made longer by the housing wall 30 and the cover wall 92 constituting the overlapping portions 54A, 54B. In this way, foreign matter, such as oil, is less likely to enter the respective accommodating portions 50A, 50B through the entrance path. Thus, the entrance of foreign matter, such as oil, into the respective accommodating portions 50A, 50B can be suppressed.

The restricting wall 34 for restricting a path for the wire 100B is provided continuously with the second base end wall 31B constituting the side wall 52B of the accommodating portion 50B. The restricting wall 34 restricts the path for the wire 100B. Thus, a configuration around the connector 10 can be simplified as compared to the case where a restricting member for restricting the path for the wire 100B is provided separately from the connector 10.

The tip of the section wall 93 of the cover 90 is located in the groove 23 of the inner connecting portion 21. The section wall 93 and the groove 23 lengthen the entrance path for foreign matter, such as oil, thereby reducing the risk of oil penetration.

This embodiment can be modified as follows. This embodiment and the following modifications can be carried out in combination without technically contradicting each other.

The groove 23 of the inner connecting portion 21 can be omitted.

Sealing members can be provided between the openings 51A, 51B of the accommodating portions 50A, 50B and the respective wires 100A, 100B.

The second connector 60 can be omitted.

Each connecting portion 43 may be bent along the surface direction of the one end surface 81a of the separation wall 81.

The connector 10 can be applied to cases covering various devices without limiting application to the case 200 of the transmission.

The respective wires 100A, 100B may not be arranged in parallel and may be routed in mutually different directions.

A restricting wall 34 continuous with the first base end wall 31A can also be formed.

The restricting wall 34 can be omitted.

Although the overlapping portions 54A, 54B are formed by the cover 90 overlapping the housing wall 30 from the outer peripheral side, these may be formed by the cover 90 overlapping the housing wall 30 from the inner peripheral side.

The overlapping portions 54A, 54B can be omitted.

The partition wall 53 can be omitted.

The connector 10 may include one busbar and one accommodating portion for covering a connecting portion of this busbar.

The connector 10 may include three or more busbars and three or more accommodating portions for respectively individually covering connecting portions of these busbars.

LIST OF REFERENCE SIGNS 10 connector
20 first connector
21 inner connecting portion
22 outer connecting portion
23 groove
23a base end
30 housing wall
31A first base end wall
31B second base end wall
32A first mounting wall
32B second mounting wall
33 section wall
33a tip
34 restricting wall
35 coupling wall
36 step
37 locking claw
40A busbar
40B busbar
41 first end part
42 second end part
43 connecting portion
44 insertion hole
50A first accommodating portion
50B second accommodating portion
51A opening
51B opening
52A side wall
52B side wall
53 partition wall 54A overlapping portion
54B overlapping portion
60 second connector
61 inner connecting portion
62 outer connecting portion
70 metal terminal
71 one end part
72 other end part
80 housing
81 separation wall
81*a* one end surface
81*b* other end surface
82 sealing member
83 flange
90 cover
91 bottom wall
92 cover wall
93 section wall
94 pull-out portion
95 locking portion
100A wire
100B wire
101 terminal
110 collar
120 bolt
121 nut
200 case
201 mounting hole
202 screw hole
S clearance

What is claimed is:

1. A connector to be mounted on a case to electrically connect a device arranged inside the case and a device arranged outside the case, comprising:
a housing made of resin and including a separation wall separating an inside and an outside of the case;
a cover made of resin and to be mounted on the housing;
accommodating portions defined by the housing and the cover;
a partition wall provided between the accommodating portions and partitioning between the accommodating portions,
a plurality of busbars, each of the busbars including a first end part provided with a connecting portion to be connected to a terminal of a wire routed inside the case, the connecting portions individually being accommodated respectively in the accommodating portions defined by the housing and the cover so that the connecting portions are covered by the cover, and each of the busbars further having a second end part on a side opposite to the first end part, the busbars being embedded in the separation wall, with the first end part and the second end part of each of the busbars being exposed from the separation wall.

2. The connector of claim 1, wherein a housing wall rising from the housing and a cover wall rising from the cover include overlapping portions overlapping each other in a thickness direction of a side wall forming the accommodating portion.

3. The connector of claim 1, wherein a restricting wall for restricting a path for the wire is provided continuously with a side wall forming the accommodating portion.

4. The connector of claim 1, wherein:
the connecting portion includes an insertion hole into which a bolt for fastening the terminal to the connecting portion is insertable, and
a part facing the insertion hole, out of a side wall forming the accommodating portion, is configured by the cover.

5. The connector of claim 4, wherein a housing wall rising from the housing and a cover wall rising from the cover include overlapping portions overlapping each other in a thickness direction of a side wall forming the accommodating portion.

6. The connector of claim 5, wherein a restricting wall for restricting a path for the wire is provided continuously with a side wall forming the accommodating portion.

* * * * *